No. 12,183. REISSUED DEC. 8, 1903.
A. GUINDON.
ROTARY ENGINE.
APPLICATION FILED NOV. 12, 1903.
7 SHEETS—SHEET 1.
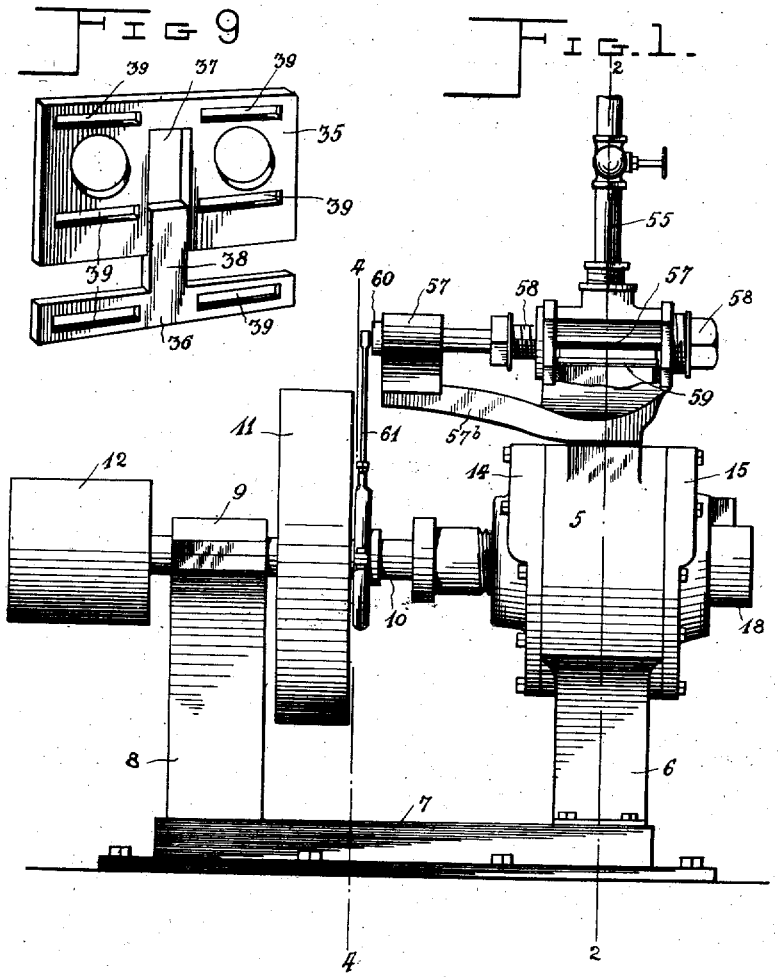
Witnesses:
Arnaesch.
John T. Deuperwil
Arthur Guindon, Inventor
By Marion & Marion
Attorneys No. 12,183. REISSUED DEC. 8, 1903.
A. GUINDON.
ROTARY ENGINE.
APPLICATION FILED NOV. 12, 1903.
7 SHEETS—SHEET 2.
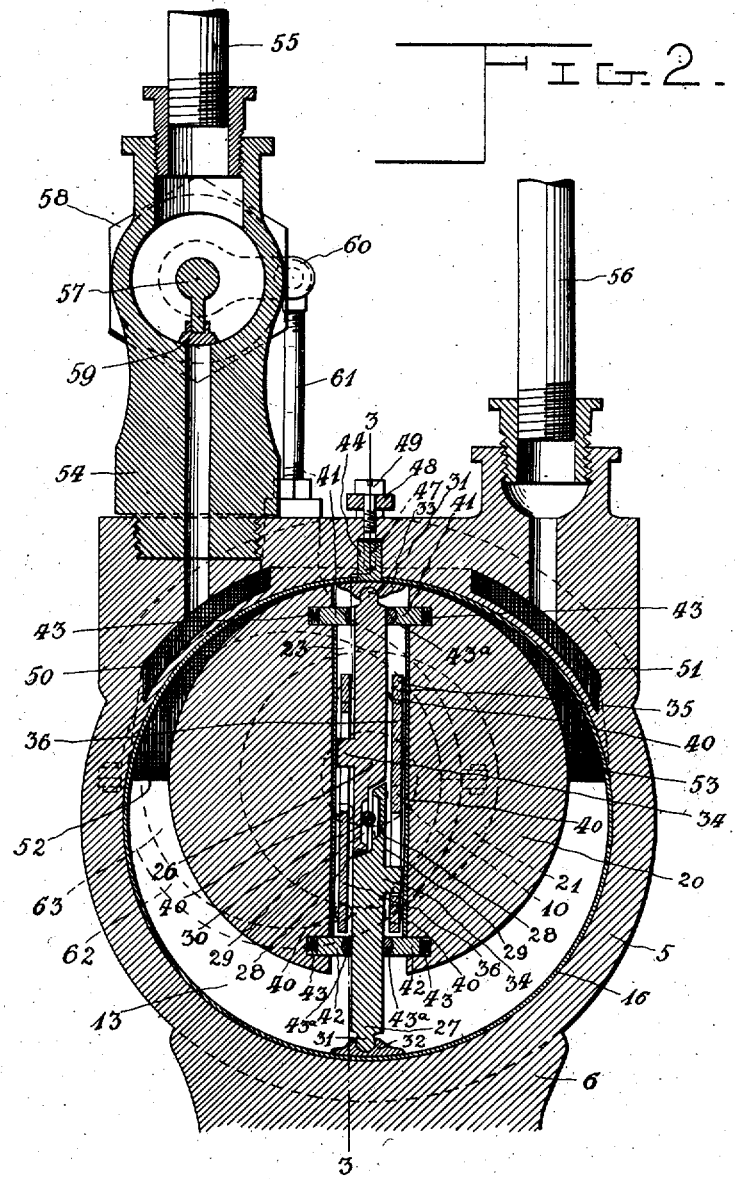
Witnesses:
Avonaesch.
John T. Deuffenwiel
Arthur Guindon, Inventor
By Marion & Marion
Attorneys No. 12,183. REISSUED DEC. 8, 1903.
A. GUINDON.
ROTARY ENGINE.
APPLICATION FILED NOV. 12, 1903.
7 SHEETS—SHEET 3.
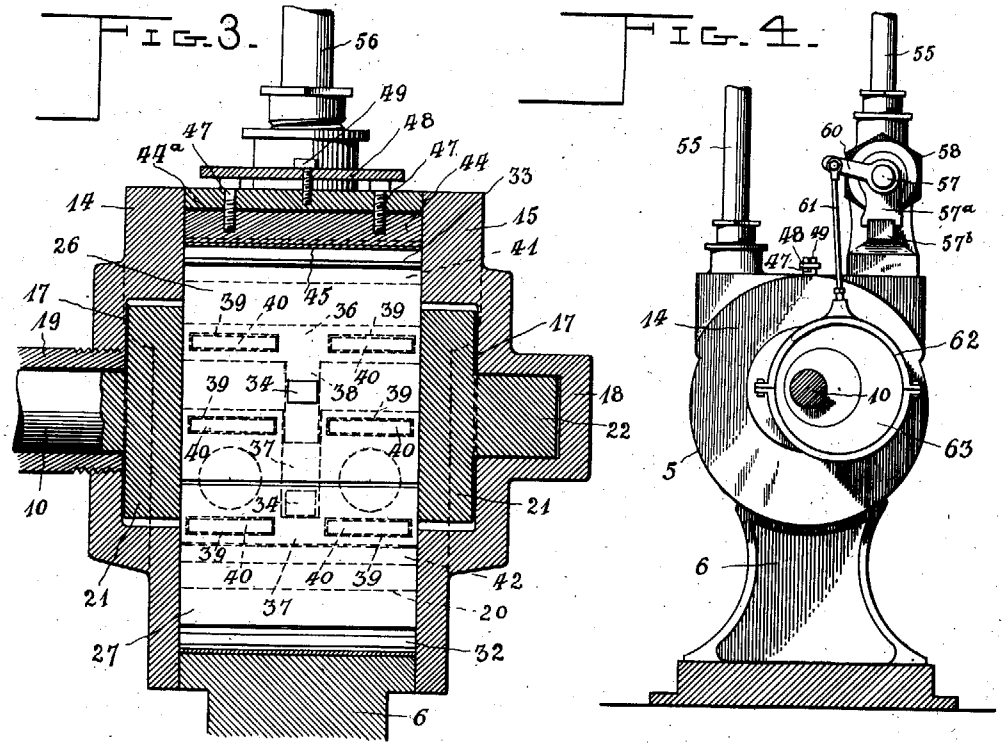
Witnesses:
A. Vonaesch.
John T. Dempsey
Arthur Guindon, Inventor
By Marion & Marion
Attorneys No. 12,183. REISSUED DEC. 8, 1903.
A. GUINDON.
ROTARY ENGINE.
APPLICATION FILED NOV. 12, 1903.
7 SHEETS—SHEET 4.
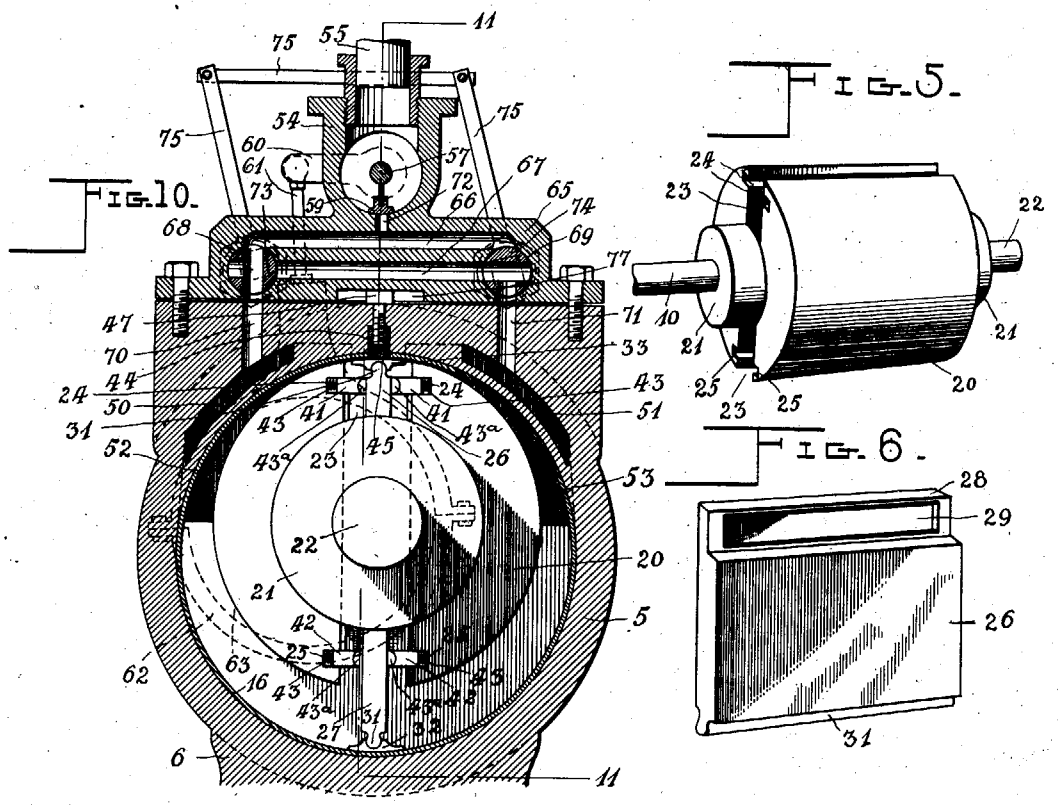
Witnesses:
A. Vornaesch.
John F. Deufferwield
Arthur Guindon, Inventor
By Marion & Marion
Attorneys No. 12,183. REISSUED DEC. 8, 1903
A. GUINDON.
ROTARY ENGINE.
APPLICATION FILED NOV. 12, 1903.
7 SHEETS—SHEET 5.
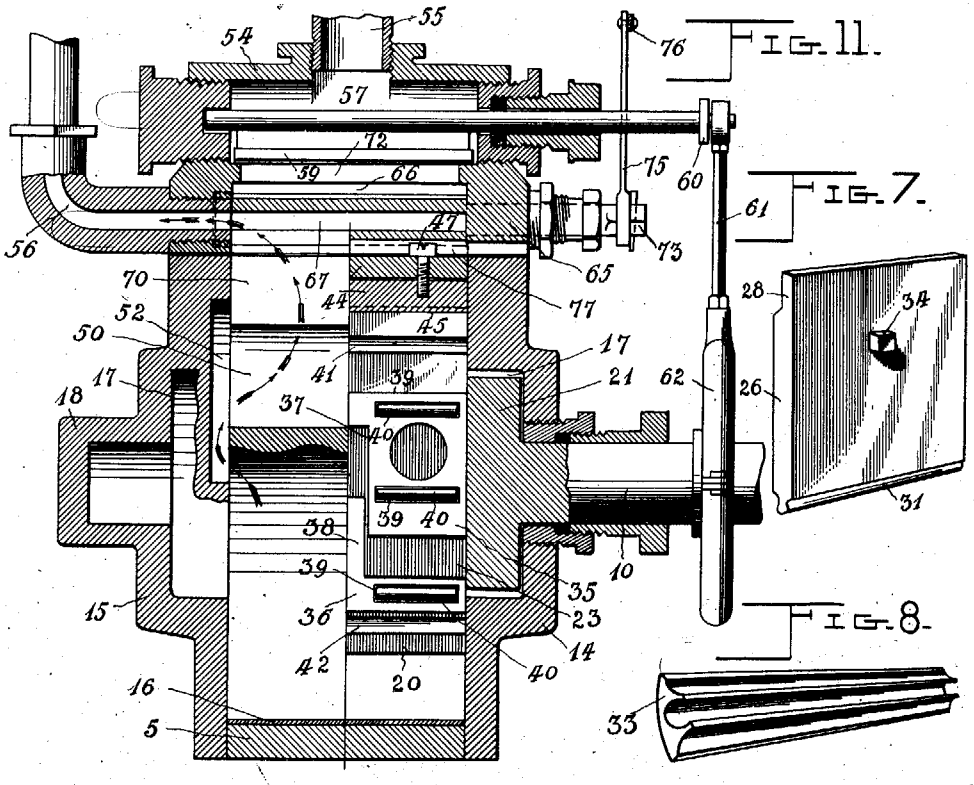
Witnesses:
A. V. Nalesch.
John T. Dempsey
Arthur Guindon, Inventor
By Marion & Marion
Attorneys No. 12,183. REISSUED DEC. 8, 1903.
A. GUINDON.
ROTARY ENGINE.
APPLICATION FILED NOV. 12, 1903.
7 SHEETS—SHEET 6.
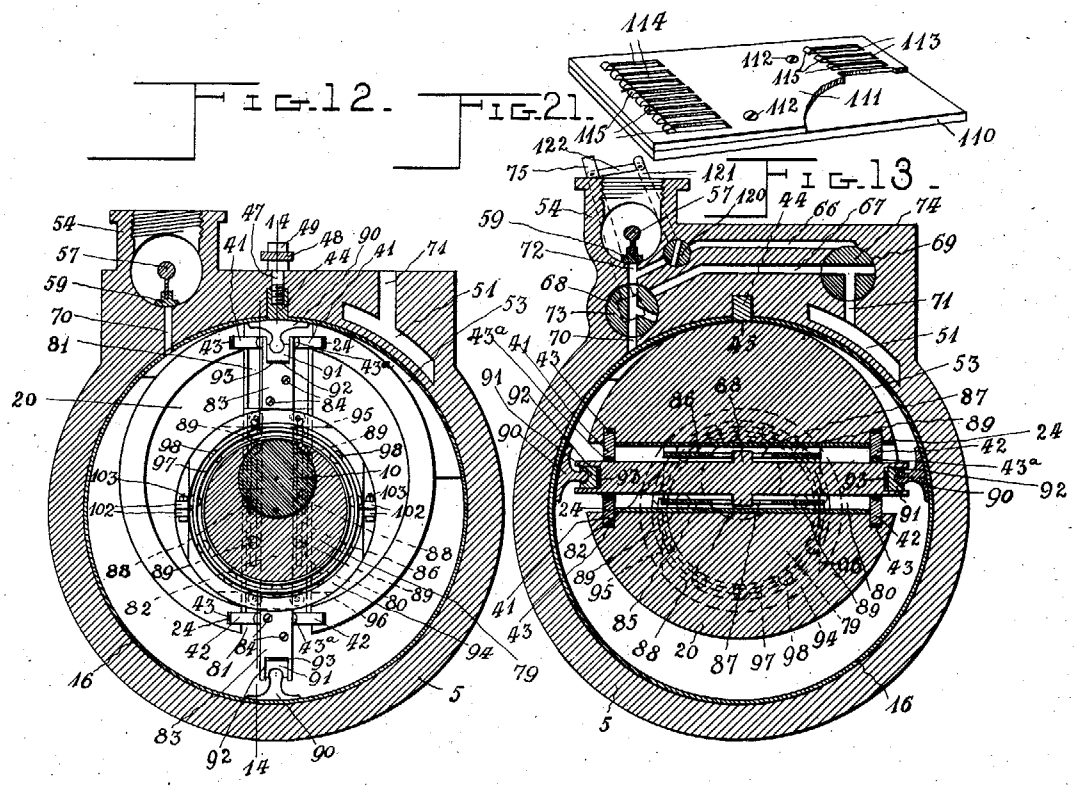
Witnesses:
avonalsh.
John F. Dewerival
Arthur Guindon, Inventor
By Marion & Marion
Attorneys No. 12,183. REISSUED DEC. 8, 1903.
A. GUINDON.
ROTARY ENGINE.
APPLICATION FILED NOV. 12, 1903.
7 SHEETS—SHEET 7.
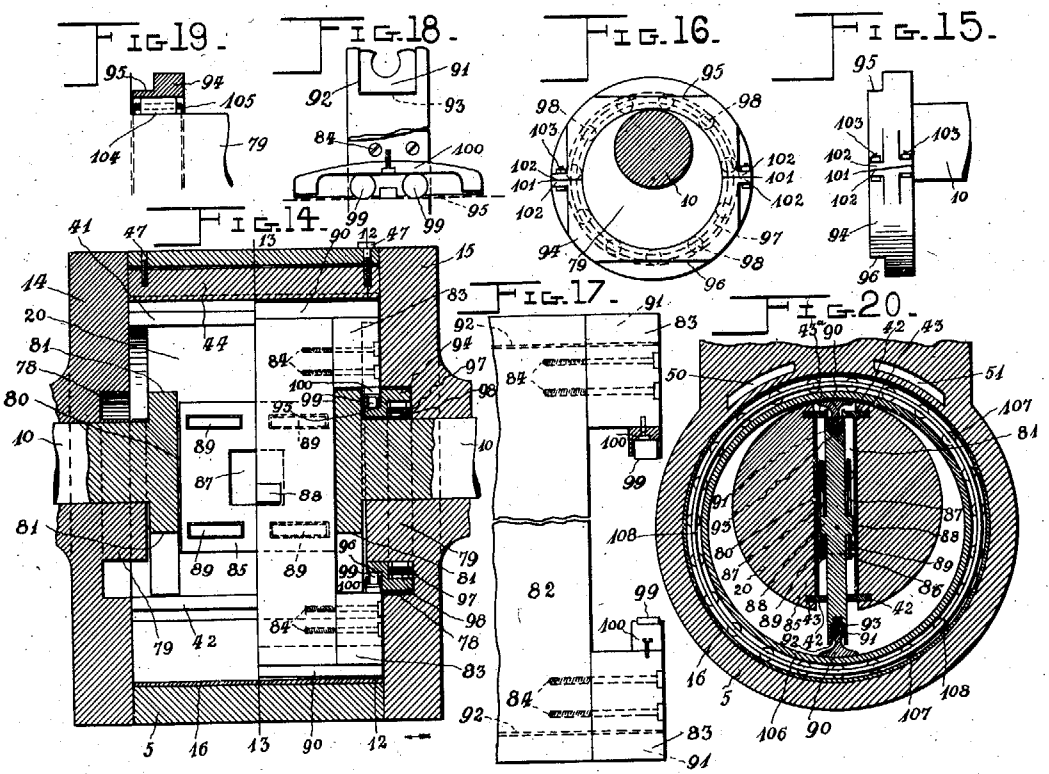
Witnesses:
A. Vonaesch.
John F. Deutterwich
Arthur Guindon, Inventor
By Marion & Marion
Attorneys No. 12,183. Reissued December 8, 1903.

UNITED STATES PATENT OFFICE.

ARTHUR GUINDON, OF MONTREAL, CANADA.

ROTARY ENGINE.

SPECIFICATION forming part of Reissued Letters Patent No. 12,183, dated December 8, 1903.

Original No. 688,947, dated December 17, 1901. Application for reissue filed November 12, 1903. Serial No. 180,963.

*To all whom it may concern:*

Be it known that I, ARTHUR GUINDON, a subject of the King of Great Britain, residing in the city and district of Montreal, in the Province of Quebec, Canada, have invented certain new and useful Improvements in Rotary Engines; and I do hereby declare that the following is a full, clear, and exact description of the invention, such as will enable others skilled in the art to which it appertains to make and use the same.

My invention relates to improvements in rotary engines; and the objects are, first, to construct and arrange the parts in a simple manner with a view to securing a high degree of efficiency; secondly, to provide means for controlling the admission and exhaust of the motive fluid, so that it may be used expansively; thirdly, to simplify the reversing mechanism; fourthly, to reduce the friction and wear on the elements of the rotary eccentric piston; and fifthly, to exclude the admission of the motive fluid from the interior of the rotary element of the eccentric piston.

With these and such other ends in view as pertain to an invention of this character it consists in the novel combination of devices and in the construction and arrangement of parts, as will be hereinfter fully described, and defined by the claims.

In the drawings hereto annexed, forming a part of this specification, Figure 1 is a side elevation of my improved rotary engine with a part of the valve-chest broken away. Fig. 2 is an enlarged vertical transverse section taken centrally through the engine in the plane of the dotted line 2 2 on Fig. 1. Fig. 3 is a vertical sectional elevation taken longitudinally through the engine in the plane indicated by the dotted line 3 3 on Fig. 2 and showing the slidable piston element in elevation. Fig. 4 is an end elevation, partly in section, the plane of the section being indicated by the dotted line 4 4 on Fig. 1 looking in the direction of the arrow. Fig. 5 is a detail perspective view of the cylindrical revoluble element of the eccentric piston removed from the engine. Fig. 6 is a detail perspective view of one of the two-part slidable piston members. Fig. 7 is a view in perspective of the part shown by Fig. 6 looking at the opposite face thereof. Fig. 8 is a detail perspective view of one of the piston-shoes. Fig. 9 is a detail perspective view of one of the expansible friction-plates associated with each part of the slidable piston member. Fig. 10 is an enlarged vertical transverse section through my improved rotary engine, illustrating a reversing mechanism therefor. Fig. 11 is a vertical sectional elevation through the engine shown by Fig. 10, the plane of the section being in the line 11 11 of said Fig. 10. Fig. 12 is a transverse sectional elevation through a high-powered engine of large capacity and embodying certain features of invention in addition to the improvements disclosed by the preceding figures, the parts being shown in one position and the plane of the section being on the line 12 12 of Fig. 14. Fig. 13 is a similar view of the same engine in the plane of the line 13 13 on Fig. 14 and with the piston turned one-quarter around. Fig. 14 is a longitudinal sectional elevation with half of the parts in section and the remaining half in elevation, the plane of the section being indicated by the dotted line 14 14 on Fig. 12. Fig. 15 is a detached view, in edge elevation, of the friction-ring associated with the engine-piston represented by Figs. 12 to 14, inclusive. Fig. 16 is a side elevation of the parts shown in Fig. 15. Fig. 17 is a plan view, partly broken away, of the slidable piston member employed in the engine represented by Figs. 12 to 14, inclusive. Fig. 18 is an edge view of a part of the sliding piston member shown by Fig. 17. Fig. 19 is a sectional elevation of a modified form of roller-bearing ring. Fig. 20 is a transverse sectional view through another embodiment of high-powered rotary engine, illustrating means for minimizing the friction. Fig. 21 is a view illustrating another form of friction-plate between the interior surface of the engine-cylinder and the slidable element of the eccentric rotary piston.

The same numerals of reference denote like parts in each of the several figures of the drawings.

5 designates the engine-cylinder, which is represented by Fig. 1 as mounted upon a pedestal 6 on the bed-plate 7, which is equipped at one end with a standard 8, the upper end of which is furnished with a shaft-bearing 9. The engine-shaft 10 is mounted partly in said shaft-bearing 9, and said engine-shaft is equipped with the eccentric balance-wheel 11 and the pulley 12.

The cylinder 5 has a piston-chamber 13, which is closed at opposite ends by the cylinder-heads 14 15, the interior surface of the cylinder being furnished with a lining 16, which takes up the wear due to the frictional engagement of the piston-shoes therewith. The cylinder-heads are provided in their inner faces with circular recesses 17, which are struck from centers located at one side of the imaginary axis of the circular cylinder, whereby said recesses 17 occupy eccentric relation to the cylinder. The head 15 is provided with an axle-bearing 18, while the other head 14 has a stuffing-box 19, said axle-bearing and the stuffing-box being arranged in alinement with each other and centrally with respect to the eccentric recesses 17.

The piston of my improved engine is of the type known as "rotary eccentric" pistons, embracing, essentially, a revoluble element and a slidable element or elements, the latter being loosely fitted to the revoluble element, so as to be capable of rotation therewith and a loose sliding play therein. The rotary piston member is indicated by the numeral 20, the same being provided at its ends with the bosses 21, which are fitted loosely in the recesses 17 of the cylinder-heads. Said piston member has a stub-axle 22 projecting from one boss 21, so as to occupy the axle-bearing 18, while the engine-shaft 10 is made fast in any approved way with the other boss 21 and extends through the stuffing-box 19, whereby the piston member 20 is mounted within the cylinder to occupy an eccentric relation thereto and to be free to rotate therein. Furthermore, the piston member 20 is provided with a longitudinal diametrical slot 23, which practically divides the piston into two equal members united by the bosses 21, as shown more clearly by Fig. 5, and said piston is provided in the parallel walls formed by the slot with the shoe-receiving recesses 24 25, one pair of recesses being provided in the walls of the slot near the circumference of the piston member and in opposing coincident relation longitudinally thereof. The slot 23 provides for the reception in the revoluble member 20 of the slidable piston member, which in the types of engines shown by Figs. 1 to 11 consists, essentially, of two plates 26 27, each of which is loosely arranged in the slot 23; but in the high-powered engine represented by Figs. 12 to 20, inclusive, this slidable piston member is a single plate associated with means whereby reciprocating motion is given positively thereto on the rotation of the cylindrical revoluble member, as will hereinafter more fully appear. The plates 26 27, which constitute the slidable piston member, are cut away at their inner approximate edges, so as to form the tailpieces 28, (see Figs. 6 and 7,) and which have the overlapping relation shown by Fig. 2, and these tailpieces of the two plates are recessed on their inner opposing faces, as at 29, thus forming a pocket which receives a friction-roller 30. The two plates forming the slidable piston member are designed to have a limited independent play endwise with respect to each other, which is secured by proper proportions of the tailpieces thereof; but the friction between these tailpieces due to the movements of the plates is minimized by the interposition of the friction-roller 30 therebetween. The plates of the slidable member are provided at their outer edges with the rounded tongues 31, to which are loosely fitted the shoes 32 33, arranged to travel against the lining of the piston-cylinder and to have a loose movement on the plates of the slidable piston member owing to the tongued connection therewith. Each plate forming a part of the slidable piston member is furthermore provided with a rigid stud 34 of any suitable form and adapted to connect a two-part friction-plate loosely to said piston-member plate. This friction-plate, of which two are employed in connection with the members of the slidable piston, consists of two parts 35 36, (shown by Fig. 2 and more clearly by Fig. 9,) each part of said friction-plate having a series of roll-receiving slots 39. The part 35 of each friction-plate has a slot 37, which extends through one edge thereof, while the other part 36 of said friction-plate has a tongue 38, which is loosely received in the slot 37. In the operative position of the parts comprising the piston the plates of the slidable piston member are disposed centrally in the slot 23 of the revoluble piston member. One friction-plate is arranged on one side of the overlapping piston-member plates, so as to receive the stud 34 from one piston-member plate in the slot 37 thereof, and the other friction-plate is arranged on the opposite side of the slidable piston member and receives in its slot 37 the stud 34 from the other piston-member plate. The two friction-plates are thus interposed between the walls of the slot in the revoluble piston member and the plates of the slidable piston member, and said friction-plates are connected individually with the plates of the slidable piston member and in a loose manner, whereby the sliding movement of a piston-member plate is communicated by the stud to one part or the other of the friction-plate. The two friction-plates are equipped with antifriction-rolls 40, which are received loosely in the slots 39 of the two parts of said friction-plates, said rolls exceeding in diameter the thickness of the friction-plates and adapted to ride against the slidable piston member and the walls of the slot in the revoluble piston member.

It is desired to exclude the admission of motive fluid from the interior of the piston; but as there is considerable space left between the walls of the slot, the slidable piston member, and the friction-plates I have found it necessary to provide additional shoes laterally arranged with respect to the slidable piston member and which are disposed in the recesses 24 25. Said fluid-excluding shoes are indicated at 41 42 as being grouped in pairs to engage with opposite faces of the plates of the slidable piston member at points beyond the end edges of the friction-plates, each lateral shoe 41 or 42 being held in its operative position by a light coiled spring 43, housed in one recess 24 or 25. Each lateral shoe is provided in its edge next the slidable piston member with a recess or groove which receives a wear-strip 42[a], that has intimate facial contact with said piston member. The recess in the shoe is rounded and the inner edge of the wear-strip is correspondingly rounded in order that the latter may have a limited turning or oscillating play in the shoe according to any lateral play of the slidable piston member when the parts become worn through service.

By reference to Fig. 3 it will be observed that the cylindrical piston member 20 fits snugly against the cylinder-heads 14 15, that the slidable piston member extends the full length of the revoluble member, so that its end edges will likewise engage closely with the heads of the cylinder, and that the piston-shoes 32 33 and the lateral shoes 41 42 likewise extend the full length of the piston, so as to fit snugly to the cylinder-heads.

The eccentric disposition of the rotary piston in the cylinder brings one portion of its circumference in contact with the cylindrical lining, preferably at the top edge of the cylinder, and to effectually cut off the passage of steam or other motive fluid from the intake side to the exhaust side of the piston-cylinder, or vice versa, I provide the adjustable abutment-plate 44, extending the full length of the cylinder and fitting in a recess 44[a] in the top part thereof. Said abutment-plate has an arcuate face 45, the radius of which is equal to the radius of the revoluble piston member, and the width of the arcuate face of each piston-shoe is more than twice the width of the face 45 of said abutment-plate.

The improved construction of the abutment-plate secures the necessary close fitting of one side of the revoluble piston member to the cylinder to maintain the steam-tight joint, and the increased width of the piston-shoe as compared to the abutment-plate excludes all danger of hurt and injury to the parts as well as the leakage of the motive fluid between the abutment-plate and the piston-shoe when the latter travels past the former in the rotation of the revoluble piston member. The element which is in the form of the abutment-plate is adjustable to compensate for wear on the working parts through the medium of suitable adjusting-screws 47, each engaging with a keeper 48, secured on the cylinder by a screw 49. Said adjusting-screws have threaded engagement with the abutment-plate, as shown by Figs. 2 and 3, for the purpose of moving said plate relative to the path of the piston. The screws 47 serve to adjust the abutment-plate relative to the eccentric piston, and the keeper may be adjusted into engagement with the heads of the screws 47 in a manner to prevent the screws from turning, said keeper being tightened upon the screw-heads by the screw 49.

The cylinder 5 is provided with a longitudinal feed-chamber 50 on one side of the abutment-plate and with a similar exhaust-chamber 51 on the opposite side of said abutment-plate. The feed-chamber opens into a recess 52, which is provided in one cylinder-head, so as to form a steam-passage from the feed-chamber to the piston-chamber. In like manner the exhaust-chamber 51 is in communication with a recess 53 in the two cylinder-heads, said recess establishing communication from the piston-chamber to the exhaust-chamber, whereby the steam or other motive fluid is made to circulate from its point of supply along the chamber 50, thence through the recess 52 into the piston-chamber, wherein its energy is utilized expansively to drive the rotary piston, from which piston-chamber the motive fluid is exhausted through the passage or recess 53, thence into the exhaust-chamber 51, and finally through an exhaust-pipe, all as indicated more clearly by Figs. 2 and 11.

54 designates a valve-chest which is mounted upon the cylinder to have communication with the feed-chamber 50 throughout the length thereof, as indicated by Fig. 1. A feed-pipe 55 is coupled to this valve-chest, and an exhaust-pipe 56 is coupled to the cylinder for communication with the exhaust-chamber 51. A rocking valve-shaft 57 is mounted in bearings afforded by the stuffing-boxes 58, (see Fig. 1,) and this shaft carries a swinging valve 59, which finds a suitable seat in the circular inner surface of the valve-chest, whereby the rocking motion of the shaft oscillates the valve to open and close the steam-passage leading from the valve-chest to the feed-chamber. The protruding end of the valve-shaft finds a bearing 57[a], supported by an arm 57[b], (see Fig. 1,) said end of the shaft being equipped with a rocker-arm 60, to which is pivoted the upper extremity of an eccentric-rod 61, having a yoke 62, which is fitted on the eccentric 63, mounted on the engine-shaft 10.

In the operation of the engine the valve remains open long enough to admit steam to the piston-chamber and exert the necessary pressure in rear of the slidable piston member; but when the piston travels beyond the inlet-chamber the valve is closed, according to the speed of the engine, and the steam is used expansively to propel the piston. Steam is exhausted from the piston-chamber and admitted to the same chamber by the action of the eccentric or by the travel of the slidable piston member. Said slidable piston member moves in the slot of the revoluble piston member by reason of the eccentric position of the revoluble member in the piston-chamber; but normally the plates of the slidable piston member are thrown outward by the centrifugal energy developed by rotation of the piston, so that the piston-shoes will travel against the lining of the cylinder and secure the necessary close friction-contact therewith.

The engine heretofore described is adapted to rotate in one direction only and as indicated by the arrow; but in Figs. 10 and 11 I have represented a simple form of reversing mechanism by which the piston may be driven in one direction or the other. A steam-chest 65 is bolted securely to the top part of the engine-cylinder, said chest being provided with the longitudinal fluid-passages 66 67, which open at their ends into the circular valve-seats 68 69, from which seats lead the connecting-passages 70 71, the latter serving to establish communication from the chest to the chambers 50 51, as clearly shown by Fig. 10. A valve-chest 54, similar to the chest heretofore described, is mounted upon the steam-chest 65 and communicates with the passage 70 thereof by an intermediate short passage 72. The plug-shaped valves 73 74 are fitted snugly in the seats 68 69 at the ends of the fluid-passages, each plug having a three-way passage therein and said plugs arranged in the seats, so that the passage of one plug lies at right angles to the passage of the other plug, whereby one valve-plug may be adjusted to establish communication between the valve-chest and the feed-chamber of the cylinder, while at the same time the other valve-plug opens communication from the exhaust side of the piston-chamber to the other fluid-passage of the steam-chest, which is in communication with the exhaust-pipe 56, as represented by Fig. 11. The valves are connected for simultaneous operation through the medium of the arms 75, having the links 76 pivoted thereto, said arms being made fast with the valve-plugs at one end thereof. Either of the arms or the link may be grasped by hand for the purpose of changing the position thereof, thus reversing the positions of the plug-valves, so as to admit the motive fluid into the side of the piston-chamber from which it was previously exhausted and at the same time exhaust the motive fluid from that side of the piston-chamber to which the live motive fluid is supplied in the position of the parts shown by Fig. 10. The steam-chest 65 is provided in its under face with a longitudinal central recess 77, adapted to receive the heads of the adjusting-screws 47, by which the abutment-plate may be raised or lowered with reference to the path of the rotary eccentric-piston, thus making provision for access to the screws by fitting a spanner or wrench in said recess 77, so as to turn the latter without removing the steam-chest.

I will now proceed to describe the construction of rotary engine represented by Figs. 12, 13, and 14 and in detail by Figs. 15, 16, 17, and 18. This embodiment of the invention is especially intended for structures of large capacity and high speed, and while it preserves the same general features of construction as the engine heretofore described I have found it desirable to modify the construction with respect to the slidable piston member, which is now made in the form of a single plate adapted to be moved transversely to the axis of the rotary piston member and maintained in normal position by the cams, the position of the slidable piston member being positively controlled through the agency of cams or eccentrics, which afford tracks upon which travel suitable shoes in the form of friction-rollers or tempered-steel plates that are carried by the slidable piston member.

The cylinder-heads 14 15 have eccentric recesses 78 78 so formed therein as to produce the cams or eccentrics 79 79 as integral parts of said cylinder-heads, said integral stationary cams or eccentrics occupying corresponding positions in the piston-chamber, one of said cams or eccentrics and the recess being clearly indicated at the left hand in Fig. 14. The rotary piston member 20 is provided with a central slot 80, similar to the slot 23 in the piston heretofore described; but in this type of engine I have found it desirable to form longitudinal grooves 81 in the diametrically opposite faces of the piston member 20, each groove extending the length of the cylindrical piston member. The slidable piston member is a single plate 82, the width of which is equal to the width of the slot 80 in the rotary member, so that the slidable member may snugly fit therein; but the length of this slidable member exceeds the length of the rotary member, within which said plate 82 is adapted to have the limited edgewise travel. At its end portions the plate is increased in width by the extension-plates 83, which are applied to said side edges of the plate, as shown by Figs. 14 and 17, and which are secured in place by suitable countersunk screws 84. These extension-plates of the slidable piston member enable the latter to have the desired engagement with the inner faces of the cylinder-heads and on the circles of the cams, (see Fig. 14,) and said edge plates of the slidable piston member are adapted to occupy the grooves 81 in the rotary piston member.

To reduce the friction and wear incident to the slidable travel of the plate-like piston member 82 and the revoluble piston member, I provide the friction-plates 85 86, which are disposed on opposite sides of said plate member 82, and thereby interposed between the latter and the walls of the slot 80 in said rotary member. Each plate is in a single piece and not in two parts, as described in the embodiment of invention heretofore set forth, each friction-plate being housed in said slot 80, as clearly shown by Figs. 12 and 13. Furthermore, each friction-plate has a longitudinal slot 87, in which is fitted a stud 88 on the slidable piston member, and said friction-plates are carried by the friction-rollers 89, adapted to travel on the piston member 82 and the walls of the piston-slot 80. To exclude the motive fluid from the piston-slot, the lateral shoes 41 42 are fitted in recesses provided in the rotary piston member and arranged to ride against the faces of the slidable piston member 82. The piston-shoes 90 are connected operatively with opposite end portions of the slidable piston member through the medium of the carrier-plates 91, each of the latter having the pivotal connection with the carrier-plate, which is slidably fitted in recesses 92, provided in the end edges of the plate 82 and the edge extension-plates 83 thereof, as clearly indicated by Figs. 12, 13, and 18, each carrier-plate being pressed outwardly by a light coiled spring 93, which serves to initially maintain the piston-shoes in frictional engagement with the piston-cylinder.

As heretofore described, the slidable piston member is adapted to be reciprocated back and forth positively by the cam-tracks afforded by the eccentrics 79; but as said slidable piston member in the high-powered engine is in a single plate adapted to turn on different centers during each complete rotation of the revoluble piston member—*i. e.*, on the center of the cylinder, as shown by Fig. 12, and on the center of the eccentrically-arranged revoluble piston when in the position shown by Fig. 13—it becomes necessary to allow this slidable piston member to have a limited shifting movement. This is provided for by the employment of intermediate devices between the cam-tracks afforded by the eccentrics and the single-plate piston member, said intermediate devices being revoluble with the piston and capable of a limited independent play and also reducing the friction and wear between the engaging parts. These intermediate devices are in the form of track-rings 94. (See Figs. 14, 15, and 16.) Each track-ring has a flange 95 and an offset edge 96, the latter affording track-surfaces for friction-rollers or friction-plates without rollers carried directly by the slidable piston member, as will hereinafter appear. Within the track-ring 94 is arranged loosely a guide-ring 97, having a plurality of rollers 98, as indicated by full and dotted lines in Figs. 14 and 16, said annular series of rollers 98 arranged to ride directly upon one eccentric or cam 79 and to loosely support the track-ring 94 thereon. Each track-ring is arranged for the portion 94 thereof to occupy the eccentric recess 78 in one cylinder-head, (see Fig. 14,) while the offset portions 95 96 of said track-ring extend into the piston-chamber, so as to have contact edgewise with one edge face of the rotary piston member. This offset portion of the track-ring forms the riding or track surfaces for the friction-rollers 99, which are mounted on the inner opposing edges of the extension-plates 83, which are secured to one side edge of the piston-plate member 82. These rollers 99 are grouped in pairs and properly confined in bearing-plates 100, which are fastened to the edge plates 83, as clearly represented by Figs. 17 and 18, and these rollers 99 are thus adapted to have a limited travel on the offsets 96, so as to make the track-rings rotate with the piston, whereby the track-rings travel around the eccentrics 79 and reduce the friction between the piston member 82 and the cams or eccentrics. It is evident that the track-rings or the rollers or the edge plates 83 may be removed when worn and replaced by new pieces at a minimum cost for repairs. To facilitate the application or removal of the track-rings, I prefer to make each ring in two parts, which are divided on the bevel-line indicated at 101 in Fig. 15, said members of the ring having the lugs 102 disposed in overlapping relation and united firmly together by the screws 103. (See Figs. 15 and 16.)

As will be noted by reference to Fig. 14, the track-ring does not have roller-bearing engagement throughout its width with the cam-track afforded by one cam or eccentric 79, and I may therefore make this track-ring partake of the shape in cross-section represented by Fig. 19. This construction of the track-ring permits the use of friction-rollers 104 or of balls adapted to be retained in place by suitable carrier-rings 105, thus supporting the track-ring on the cam or eccentric in a manner to overcome any possible tilting and insuring great freedom of rotation to the ring with the engine-piston.

In high-speed engines there is considerable friction and wear between the inner surface of the cylinder and the piston-shoes, owing to the centrifugal force developed by the slidable member of the piston when it is rapidly carried around with the rotary piston member, and in consequence of this friction in engines of this type the shoes of the piston and the inner surface of the cylinder are exposed to considerable wear and the parts require truing. To overcome these objections, I propose to employ a false cylinder-lining 106, which is loosely arranged inside of the cylinder and is maintained therein by roller-bearings. This false cylinder-lining is constructed of steel with a perfectly-true inner surface, and it is interposed between the path of the piston-shoes and the cylinder proper. The roller-bearings 107 are held in spaced relation by the carrier-ring 108, said ring and rollers entirely surrounding the false lining, so as to loosely sustain the latter within the cylinder, the rollers engaging with said false lining and with the inner surface of the cylinder, as clearly shown by Fig. 20. Owing to the frictional contact of the piston-shoes with this false lining, the latter is adapted to turn within the piston-chamber; but the shoes will slip past the false lining, which is idly sustained by the roller-bearings in the engine-cylinder.

Although I do not limit myself to any particular material in the construction of the engine, I may state that I prefer to make use of tempered steel in the construction of those parts which are exposed to friction and wear—such as the walls of the slot in the revoluble piston member, the plate-like piston member, the rollers or balls of the antifriction-bearings, the piston-shoes, and all the surfaces on which are adapted to travel the rollers or balls of the antifriction-bearings.

In Fig. 12 the live chamber in the cylinder for the motive fluid is omitted and the controlling-valve is brought down close to the piston-chamber, thus reducing the length and area of the inlet or feed passage between the controlling-valve and the piston-chamber. In Fig. 13 the same close arrangement of the controlling-valve to the piston-chamber is illustrated; but said engine is equipped with the reversing-valve mechanism, by which the piston may be driven in either direction.

I also reserve the right to embody my improvements in a compound engine in which the elements are operable to minimize vibration. This is attained by placing the large or double engine between two smaller engines and arranging the motive-fluid inlets to the two smaller engines for the fluid to pass thereinto in an opposite direction to the inlets for the fluid to the middle large engine.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

In the construction of the revoluble piston member hereinbefore described the slot therein is lined by metallic plates 110, preferably made of tempered steel, as heretofore mentioned, and within this slot are arranged the slidable piston member and the friction-plates, the latter and the rollers thereof being movable in the slot of the revoluble piston member. In the embodiment of the invention shown by Fig. 21 the lining-plates 110 and the friction-plates 111 are made fast one with the other in any approved way—as, for example, by rivets or screws 112—whereby each friction-plate is arranged within the slotted revoluble piston member to occupy a stationary position therein. Each of the two friction-plates is provided near its end edges with a series of grooves 113 114, the grooves of each series extending longitudinally of the friction-plate for a suitable distance and said series arranged transversely across said friction-plate. In said grooves are loosely mounted the antifriction rollers or balls 115, which are retained in place by any suitable means and which are free to travel longitudinally of the friction-plate within the limits of the slots therein, said rollers or balls being free to engage with the slidable piston member.

It is evident that the arrangement of the valve and the short steam-passage shown by Fig. 12 may be embodied in the construction of engine shown in Fig. 2, thus reducing the length and area of the steam-passage.

The quantity of steam in the passage 66 of the engine shown by Fig. 13 is reduced by employing a valve 120, which is seated in a suitable part of the engine across the passage 66 and close to the controlling-valve, said cut-off valve having an arm 121 linked at 122 to one of the reversing-valve arms.

No claim is herein made to the rotary eccentric piston comprising a revoluble member and a single plate member fitted slidably thereto, together with the parts coöperating with said slidable member and represented generally by Figs. 12 to 18, inclusive, because these features form the subject-matter of a separate application filed by me on April 5, 1901, Serial No. 63,181.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new is—

1. In a rotary engine, a rotary eccentric piston comprising a revoluble member, a two-part slidable member having the inner portions of its plates arranged in overlapping order, and a shiftable and revoluble roller-bearing between the overlapping portions of the plates, as and for the purposes described.

2. In a rotary engine, a rotary eccentric piston comprising a revoluble slotted member, a two-part slidable member fitted to the slotted member and having each plate thereof provided with a tailpiece arranged in overlapping relation to the tailpiece on the other plate, and a friction-roller interposed between the overlapping tailpieces of the plates which form the slidable member, substantially as described.

3. In a rotary engine, a rotary eccentric piston comprising a revoluble slotted member, a plate-like member fitted slidably in said slot of the revoluble member, and shiftable bearing plates and rollers slidably confined between said plate-like member and the walls of the slotted revoluble member, substantially as described.

4. In a rotary engine, a rotary eccentric piston comprising a slotted member, a slidable member fitted loosely therein, and friction-plates interposed between the slidable member and the walls of the slotted revoluble member, said plates provided with roller-bearings arranged to have contact with the slidable member and the walls of the slotted revoluble member, substantially as described.

5. In a rotary engine, a rotary eccentric piston comprising a revoluble slotted member, a slidable member fitted loosely therein, and roll-carrying plates loosely connected with said slidable member and arranged to travel therewith in the slot of the revoluble member, substantially as described.

6. In a rotary engine, a revoluble eccentric piston comprising a revoluble slotted member, a two-part slidable member fitted in said slot of the revoluble member, and a two-part friction-plate connected with each plate of the slidable member and provided with rolls arranged to ride against said plates of the slidable piston member and the walls of the slotted revoluble member, substantially as described.

7. In a rotary engine, a rotary eccentric piston comprising a revoluble slotted member, a slidable member loosely fitted therein, lateral shoes seated individually in the rotary slotted member and each provided with a curved recess in the projecting edge thereof, and a sole-piece adjustably fitted in the recessed edge of each shoe and having lateral contact with the slidable piston member, substantially as described.

8. In a rotary engine, the combination with a cylinder, of a rotary eccentric piston having a plate-like member fitted slidably in a revoluble slotted member and provided with shoes having arcuate faces, an abutment-plate seated in the cylinder and likewise provided with an arcuate face whose radius is equal to that of the revoluble piston member, the width of said abutment-plate being less than half the width of the arcuate face of the shoe, and means for adjusting said abutment-plate relative to the path of the eccentric piston, substantially as described.

9. In a rotary engine, the combination with a casing, of a rotary eccentric piston having a plate-like member slidably fitted to a slotted revoluble member and provided with shoes arranged to ride against the interior surface of said cylinder, an abutment-plate seated in the cylinder and having an arcuate face whose radius is equal to that of the revoluble piston member, the width of said abutment-plate being less than half the width of the arcuate face of the shoe; adjusting-screws mounted in the cylinder and having threaded engagement with the upper neutral portion of said abutment-plate, and means for locking said screws against rotation, substantially as described.

10. A rotary engine comprising a cylinder having a circular bore, a rotary eccentric piston having a revoluble slotted member which is journaled in the heads of said cylinder and carrying a slidable member which is provided with shoes arranged to ride against the inner circular surface of the cylinder, a motive-fluid chest communicating with said cylinder and having the inlet and exhaust passages and the valve-seats, a valve-chest, a valve controlling the admission of motive fluid to one passage of said chest, means for automatically opening the controlling-valve at regular periods, and the connected valves occupying said valve-seats and adapted for reversal therein to change the direction of rotation of said piston, substantially as described.

11. In a rotary engine, in combination, a cylinder, an idle lining of reduced diameter rotatably mounted therein, rollers disposed in the space between said lining and said cylinder, and a rotatable piston mounted within said lining and having shoes lying upon the inner face thereof.

12. In a rotary engine, in combination, a cylinder, an idle cylindrical lining of reduced diameter received within the same, a carrier-ring disposed in the space between said lining and said cylinder and having openings therein, rollers carried in said openings and rolling upon the outer face of said lining and the inner face of said cylinder, and a rotatable piston disposed within said lining in contact with the inner face of said lining.

ARTHUR GUINDON.

Witnesses:
J. A. MARION,
V. COEHNE.